United States Patent
Iya et al.

(10) Patent No.: US 7,478,525 B2
(45) Date of Patent: Jan. 20, 2009

(54) SYSTEM AND METHOD FOR CONTROLLING THE TEMPERATURE AND INFRARED SIGNATURE OF AN ENGINE

(75) Inventors: Sridhar K. Iya, Gig Harbor, WA (US); George M. Roe, Seattle, WA (US)

(73) Assignee: The Boeing Company, Chicago, IL (US)

( * ) Notice: Subject to any disclaimer, the term of this patent is extended or adjusted under 35 U.S.C. 154(b) by 387 days.

(21) Appl. No.: 11/268,031

(22) Filed: Nov. 7, 2005

(65) Prior Publication Data

US 2008/0264034 A1 Oct. 30, 2008

Related U.S. Application Data

(62) Division of application No. 10/830,193, filed on Apr. 22, 2004, now Pat. No. 7,013,636.

(51) Int. Cl.
 *F02K 1/38* (2006.01)
 *F02K 1/46* (2006.01)
 *F02K 3/105* (2006.01)
 *F02C 7/224* (2006.01)

(52) U.S. Cl. ............................ 60/204; 60/266; 60/267; 60/761

(58) Field of Classification Search .................. 60/204, 60/736, 266, 267, 39.5, 761
 See application file for complete search history.

(56) References Cited

U.S. PATENT DOCUMENTS

| | | | |
|---|---|---|---|
| 5,272,870 A | 12/1993 | Grieb et al. | |
| 5,363,641 A | 11/1994 | Dixon et al. | |
| 5,414,992 A * | 5/1995 | Glickstein | 60/782 |
| 6,052,987 A | 4/2000 | Dressler | |
| 6,100,463 A | 8/2000 | Ladd et al. | |
| 6,250,061 B1 | 6/2001 | Orlando | |
| 6,315,815 B1 * | 11/2001 | Spadaccini et al. | 96/6 |
| 6,415,595 B1 * | 7/2002 | Wilmot et al. | 60/736 |
| 6,769,242 B1 | 8/2004 | Balepin | |
| 7,013,636 B2 * | 3/2006 | Iya et al. | 60/204 |
| 2004/0194627 A1 * | 10/2004 | Huang et al. | 96/6 |

OTHER PUBLICATIONS

"Power Chips Will Enable Vast Geothermal Power Boost", Conference Told Business Wire, Sep. 15, 2003, see http://findarticles.com/p/articles/mi_m0EIN/is_2003_Sept_15/ai_107763071.*

Jonathan Fleming, Wing Ng; *Thermoelectric Power Generation For UAV Applications*; American Institute of Aeronautics and Astronautics; 1st International Energy Conversion Engineering Conference Aug. 17-21, 2003, Portsmouth, Virginia; pp. 1-11.

* cited by examiner

*Primary Examiner*—Ted Kim
(74) *Attorney, Agent, or Firm*—Alston & Bird LLP (57) ABSTRACT

A system and method for cooling at least a portion of an engine are provided. The engine is cooled using a fuel, such as a high heat sink fuel, that is subsequently used for combustion in the engine. The fuel can be used to cool one or more of the gases and/or components in the engine, thereby cooling the engine including an exhaust nozzle. For example, the fuel can be circulated through one or more heat exchanging devices that are disposed inside or outside a passage of the engine, and the fuel can absorb thermal energy from the engine or air that flows in the engine passage. In any case, the cooling of the engine can result in a reduction to the infrared signature of the engine.

17 Claims, 4 Drawing Sheets

SYSTEM AND METHOD FOR CONTROLLING THE TEMPERATURE AND INFRARED SIGNATURE OF AN ENGINE

CROSS-REFERENCE TO RELATED APPLICATIONS

This application is a divisional of U.S. application Ser. No. 10/830,193, filed Apr. 22, 2004, now U.S. Pat. No. 7,013,636 which is hereby incorporated herein in its entirety by reference.

FEDERALLY SPONSORED RESEARCH OR DEVELOPMENT

This invention was made with Government support under contract number F33615-99-D-2952 awarded by the U.S. Air Force. The government has certain rights in this invention.

BACKGROUND OF THE INVENTION

1) Field of the Invention

The present invention relates to the control of temperature in an engine and, more particularly, to the use of fuel for cooling engine components and especially an exhaust nozzle such as in an aircraft engine.

2) Description of Related Art

Infrared emissions from aircraft, ships, tanks, other vehicles and structures, and the like provide an "infrared signature" that generally increases as the temperature of the components and exhausts of those devices increase. For example, the exhaust nozzle of a turbine engine of an aircraft receives the hot exhaust gases from the engine and can operate at temperatures in excess of 1000° F. Thus, the nozzle can emit significant infrared energy, thereby contributing to the overall infrared signature of the aircraft. Excessive infrared emissions, e.g., as emitted from a hot nozzle, can make the aircraft more easily detectable to infrared detection equipment, which can also use the infrared signature to identify the aircraft.

Some conventional turbine engines include an annular bypass duct, or fan duct, that surrounds the engine. A fan blows air into the bypass duct, the air flows through the duct along the length of the engine, and the air is then mixed with the exhaust gas in the nozzle. Thus, the air shrouds the high temperature combustion process within the engine and also cools the nozzle, thereby reducing the infrared signature of the aircraft. The maximum temperature of the air in the bypass duct is affected by various operating parameters including the ambient temperature of the air entering the duct, the operating temperature of the engine, the amount of air circulated through the duct, and the like. Typically, the air in the bypass duct reaches a temperature of between about 500° F. and 600° F., thereby limiting the cooling effect of the air on the engine components, especially near the nozzle, and limiting the reducing effect of the air on the aircraft's infrared signature.

Thus, there exists a need for an engine system and method for controlling the temperature of the components of the engine, such as the nozzle, and/or other components on aircraft and other vehicles and devices. Preferably, the system should be capable of cooling the components directly or by cooling a flow of air that is used for cooling.

BRIEF SUMMARY OF THE INVENTION

The present invention provides a system and method for cooling at least a portion of an engine and controlling the infrared signature of the engine. According to one present invention, the fuel used for combustion in the engine is also used to cool one or more hot components in the engine. For example, the fuel may be utilized to cool the exhaust nozzle and thus reduce the infrared signature of the engine.

According to one embodiment of the present invention, the system includes an engine passage that extends between an inlet end and an exhaust end. The passage is structured to receive at least one gas therethrough, such as exhaust gas in a central passage and air through a fan duct. Fuel is supplied to a combustion device in the passage for combustion therein. A nozzle at the exhaust end of the engine passage receives the gas from the engine passage and discharges the gas. Further, a heat exchanger is configured to receive a flow of the fuel before the fuel is combusted and a flow of a fluid, e.g., air. The heat exchanger transfers thermal energy from the fluid to the fuel to cool the fluid and delivers the cooled fluid to the nozzle. In some cases, the fuel can be heated to temperatures higher than 300° F. in the heat exchanger.

In one aspect of the invention, the heat exchanger is disposed in the engine passage and cools the air in the fan duct. For example, the heat exchanger can be disposed in the fan duct and configured to receive air passing therethrough and transfer thermal energy from the air to the fuel. The heat exchanger can be disposed in the duct at a position that is proximate longitudinally to an augmentor that discharges fuel into the central passage for combustion. Alternatively, the heat exchanger can be disposed in the central passage and configured to receive fuel and cool the exhaust nozzle and/or the augmentor. The heat exchanger can also selectively function as an augmentor by discharging the fuel into the central passage for combustion.

According to another aspect of the present invention, the heat exchanger is disposed outside the engine passage and configured to receive a flow of air, transfer thermal energy from the air to the fuel, and deliver the cooled air to the engine passage. For example, the heat exchanger can receive the air from a compressor of a turbocooler. The air flows from the heat exchanger to a turbine of the turbocooler, where the air is expanded and further cooled before being delivered to the engine passage. The air flowing to the compressor of the turbocooler can be bleed air from a compressor in the engine passage. A precooler heat exchanger can also be provided for transferring thermal energy from the air flowing from the compressor in the engine passage to the fuel.

According to one method of the present invention, fuel and air are combusted in an engine passage to form an exhaust gas that is discharged from the engine passage. A flow of the fuel is circulated through a heat exchanger in the engine passage, and the fuel is delivered from the heat exchanger to the combustion device for combustion. The heat exchanger thermally communicates with the air and transfers thermal energy therefrom to the fuel to thereby cool the air that can then be used to cool the nozzle. For example, the fuel can circulate through a heat exchanger in the fan duct of the engine passage to cool a flow of air therethrough. Alternatively, the fuel can circulate through the augmentor in the central passage such that the augmentor transfers thermal energy to the fuel. In either case, the fuel can additionally circulate through a precooler heat exchanger that receives a flow of compressed air from a compressor in the engine passage such that the precooler heat exchanger transfers thermal energy from the air to the fuel.

According to another method, the fuel is circulated through a heat exchanger disposed outside the engine passage, and a flow of air is circulated through the heat exchanger to transfer thermal energy from the air to the fuel before the fuel is combusted. The cooled air is then delivered to the engine passage to cool hot engine components. For example, the flow of air passing through the heat exchanger can be compressed in a compressor of a turbocooler before the air is cooled in the heat exchanger. After being cooled in the heat exchanger, the air can be expanded and further cooled in a turbine of the turbocooler, then delivered to the engine passage.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
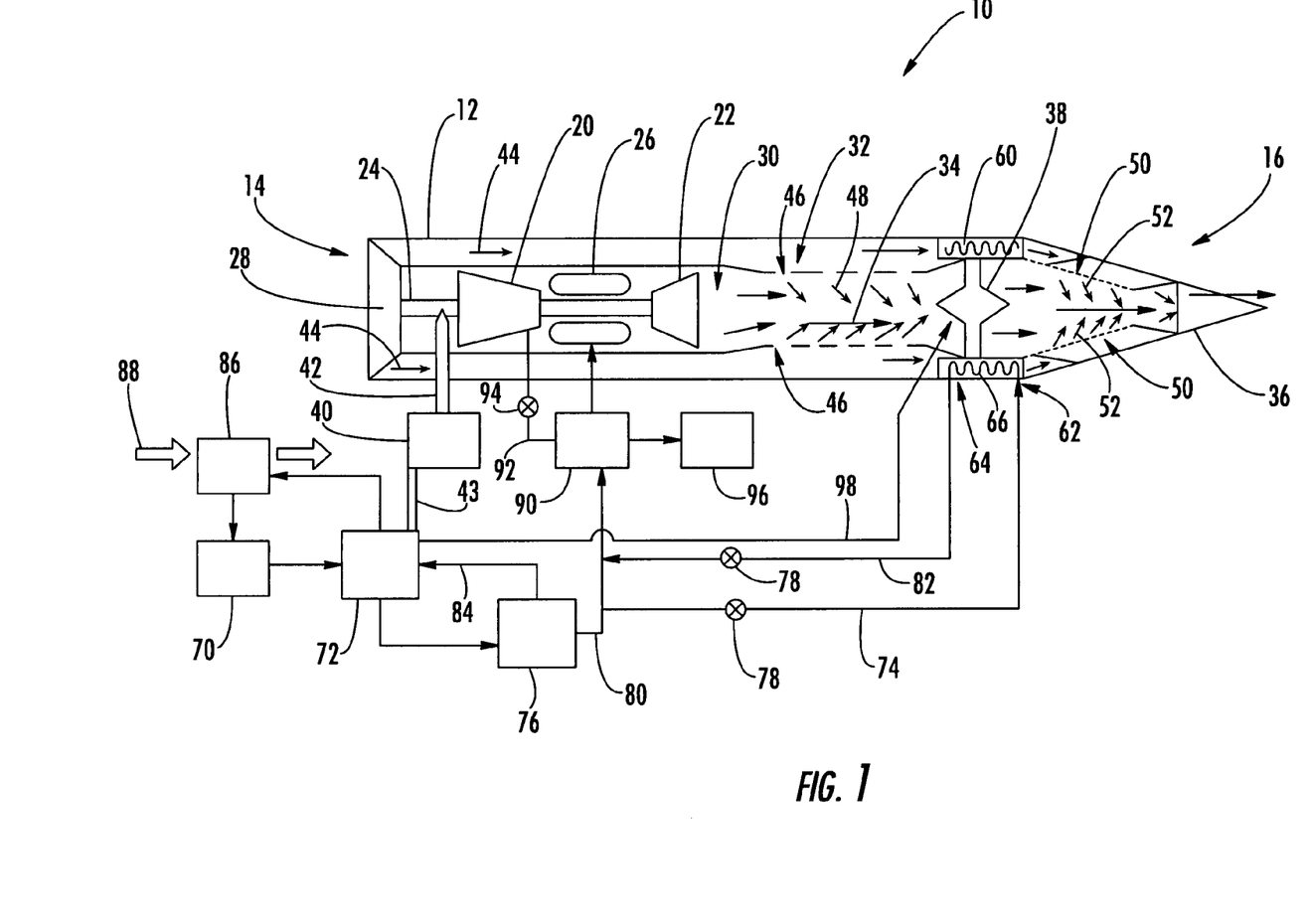
FIG. 1 is a schematic view illustrating a turbine engine with a fan duct heat exchanger according to one embodiment of the present invention.

Referring now to the figures and in particular to FIG. 1, there is shown a turbine engine 10 according to one embodiment of the present invention. While the engine 10 is described herein primarily as a thrust generation device for an aircraft, it is understood that the engine can alternatively be used for other applications such as for powering other vehicles. The engine 10 includes a housing 12 extending from an inlet side 14 to an outlet side 16 and defining an engine passage therebetween. More particularly, the engine passage includes a central passage 30 and an annular fan duct 32 or bypass duct that surrounds the central passage 30. As is known in the field of turbine engines, the engine 10 includes a compressor 20 and turbine 22 mounted axially on a shaft 24 in the central passage 30. A combustor device 26 is configured to combust fuel and thereby drive the turbine 22 and compressor 20. A fan 28 is also provided for directing air through the engine 10. In particular, the air is directed through the central passage 30 of the engine 10 for combustion, i.e., along a main stream path of the engine 10, and also through the fan duct 32.

During operation of the engine, the compressor 20 is actuated by the shaft 24 to compress air, which is then combusted with fuel introduced into the engine 10 through the combustor 26. The combustion of the fuel and air produces an expanded exhaust gas that flows in direction 34 through the central passage of the engine toward an exhaust nozzle 36, from which the exhaust gas is discharged. As the exhaust gas expands and flows through the turbine 22, the turbine 22 is rotated, thereby rotating the shaft 24 and actuating the compressor 20 and the fan 28. An augmentor 38 can also be provided in the central passage 30 to deliver additional fuel to the stream of exhaust gas for further combustion. The expansion and resulting flow of the exhaust gas through the nozzle 36 provides thrust for the aircraft. In addition, a power transmission device such as a gear box 40 can be connected to the shaft 24 by a mechanical coupling 42 and thereby driven by the rotation of the shaft 24 during operation. Rotational energy transmitted through the gear box 40 can be used to power onboard devices such as fuel pumps, electrical generators, compressors, or the like. It will be appreciated that various alternative engine configurations, some including additional engine components, can be provided in keeping with the present invention.

Cooling of the engine 10 can be achieved using the air blown through the fan duct 32 by the fan 28. The air enters the fan duct 32 at the inlet side 14 and flows in a direction 44 generally parallel to the flow of the exhaust gas in the central passage 30. The air is cooler than the hot exhaust gas produced in the engine 10 and thus cools the outer surface of the engine 10. Apertures 46 connect the fan duct 32 to the central passage 30 of the engine 10 at a location downstream of the turbine 22 so that a portion of the air from the fan duct 32 flows inward as indicated by direction 48 and mixes with the exhaust gas in the central passage 30. The remaining portion of the air in the fan duct 32 is discharged through the nozzle 36, e.g., through additional apertures 50 that are directed generally radially inward so that the air enters the central passage 30 in direction 52 at the nozzle 36. Thus, the air is mixed with the hot exhaust gas and lowers the average temperature of the nozzle 36. The cooling of the engine components can decrease the infrared signature of the engine 10 and the aircraft, thereby reducing the detectability of the aircraft by infrared detection equipment. Further, the lower operating temperature of the engine components can reduce thermal stresses and extend the useful life of the engine components.

The cooling effect of the air can be enhanced with a fan duct heat exchanger 60 provided in the fan duct 32. That is, the fan duct heat exchanger 60 can be positioned in the fan duct 32 and supported by a structure, such as a conventional portion of the structure of the engine 10. The fan duct heat exchanger 60 receives engine fuel and transfers heat from the air in the duct 32 to the fuel. The fan duct heat exchanger 60 can be a generally annular device that extends around the central passage 30. Typically, the heat exchanger 60 is positioned at an axial location in proximity to the augmentor 38 or downstream of the augmentor 38. The fan duct heat exchanger 60 defines an inlet 62, an outlet 64, and at least one fluid circuit 66 therebetween for circulating the fuel in the fan duct 32. The fluid circuit 66, illustrated schematically in FIG. 1, can be structured in various configurations. The fluid circuit 66 is configured to thermally communicate with the air in the fan duct 32, i.e., by convection as the air flows around the fluid circuit 66. For example, the heat exchanger 60 can be an air-to-liquid, cross-flow heat transfer device with fins to enhance the heat transfer. That is, the fuel can flow through a finned tube bundle and the air can flow outside the tubes, across the fins. A variety of other types and configurations of heat exchangers can alternatively be used. In some cases, the heat exchanger 60 can be an integral part of the fan duct 32.

The fuel provided for cooling the fan duct heat exchanger 60 is the same fuel used for combustion in the operation of the engine 10. The fuel is provided from a fuel source 70, which is typically a tank or other vessel. In some embodiments, the fuel source 70 can include multiple vessels, e.g., multiple fuel tanks in various locations of the aircraft. Flow of the fuel to and from the source 70 is controlled by one or more pumps and control valves, shown as a single fuel flow control unit 72 in FIG. 1. One or more pumps and/or valves or other control devices can also be provided separately and at various locations throughout the flow path of the fuel. In either case, a coupling 43 extending from the gear box 40 can be provided for actuating the pump(s). The control unit 72 can be configured to deliver the fuel through a supply line 74 in fluid communication with the fan duct heat exchanger 60, which transfers thermal energy to the fuel from the air in the fan duct 32. In addition, the control unit 72 can deliver the fuel to one or more additional heat exchanging devices 76, which transfer thermal energy to the fuel from air, oil, other fluids, or devices of the aircraft. The fuel can be delivered to the various heat exchanging devices 60, 76 in series or parallel flows and the flow path of the fuel can be changed using bypass lines circumventing any of the devices and/or valves 78 configured to adjust the flow through particular lines.

After the fuel is heated in any of the heat exchangers 60, 76, the fuel can then be delivered as needed through lines 80, 82 that provide fuel to a precooler heat exchanger 90 and the combustor 26. A portion of the heated fuel can also be recirculated to the control unit 72, e.g., through return line 84. An air/fuel heat exchanger 86 can be provided for cooling fuel in or returning to the fuel source 70. The air/fuel heat exchanger 86 circulates the fuel in communication with a flow of ram air, generally indicated by direction 88, that cools the fuel. Thus, thermal energy transferred to the fuel in the heat exchangers 60, 76 can be vented to the atmosphere or retained in the fuel until the fuel is circulated to the engine for combustion therein. The precooler heat exchanger 90, which is configured to deliver the fuel to the combustor 26 for combustion in the engine 10, is also be structured to receive a flow of bleed air from the compressor 20 through line 92, and a valve 94 is provided for controlling the flow of the bleed air. The bleed air is cooled in the precooler heat exchanger 90, i.e., by transferring thermal energy to the fuel flowing through the precooler heat exchanger 90 to the combustor 26, and the bleed air can be used as a source of compressed air and/or as a cooling fluid in other onboard devices 96 throughout the aircraft such as a turbocooler or the like. The flow rate of the bleed air can be determined according to the cooling requirements of the onboard devices 96, and the flow rate, in some cases, can be about the same as the flow rate of bleed air of conventional engines.

The engine 10 of FIG. 1 can be operated in various modes of operation. For example, in one mode of operation, the fuel is circulated through the heat exchanging device 76, e.g., to cool engine oil or components, through the fan duct heat exchanger 60 to cool the air in the fan duct 32, and then through the precooler heat exchanger 90 to cool bleed air from the compressor 20 before being delivered to the combustor 26 for combustion in the engine 10. Thus, the fuel is heated in a three-stage process, first cooling a fluid in the heat exchanging device 76, then in the fan duct heat exchanger 60, and finally in the precooler heat exchanger 90. Alternatively, the fuel can be circulated to fewer or none of the heat exchanging devices 60, 76, 90 before being combusted, or some of the fuel can be used to cool one or more of the devices 60, 76, 90 and then returned to the control unit 72 and/or the fuel source 70 before being combusted in the engine 10. Fuel for combustion in the engine 10 can be provided to the combustor 26 and/or to the augmentor 38, i.e., through line 98. In any case, the pumps, valves, and other control devices that are inside or outside the control unit 72 can be controlled according to the operational mode of the engine 10 so that the fuel is used to achieve a desired rate of cooling in the various components of the engine 10. For example, the flow of fuel to the fan duct heat exchanger 60 can be adjusted according to the temperature of the fuel and the air in the fuel duct 32, the temperature of the nozzle 36 or other engine components, the speed or other operational characteristics of the engine 10, and the like. Some or all of the control devices in the engine 10, can be controlled by one or more electronic controllers.

In addition, the operation of the engine 10 can be controlled according to the type of fuel used so that a temperature limit of the fuel is not exceeded as the fuel is heated. Conventional jet fuel such as JP-8 is stable only up to a temperature of about 300° F., and therefore cannot generally be used for cooling hot gases such as the fan air, which is typically in the temperature range of 500° F. and 600° F. However, certain fuels can include additives to increase the temperature at which the fuels become unstable. Such fuels, generally referred to as high heat sink fuels, can be stable to temperatures greater than conventional jet fuels. For example, JP-8+225 fuel is stable to a temperature of about 525° F. Thus, where JP-8+225 fuel or another high heat sink fuel is used, the fan duct heat exchanger 60 can be used to transfer sufficient thermal energy from the air in the fan duct 32 to lower the temperature of the air, e.g., by about 50° F. to 200° F. while heating the fuel to a temperature as high as about 525° F. The reduction in temperature of the air can cool the nozzle 36, e.g., so that the nozzle 36 is nearly 50° F. to 200° F. cooler than the nozzle 36 would otherwise be if the air in the fan duct 32 were not cooled by the fuel. The heated fuel from the outlet 64 of the fan duct heat exchanger 60 can be circulated through lines 82 and 80 to the precooler heat exchanger 90 and then to the combustor 26 for combustion in the engine 10 as needed for operation.

For example, in one embodiment of the present invention, the air flows through the heat exchanger 60 with at a rate of about 2000 lbm/min. If the air enters the heat exchanger at a temperature of about 514° F. and is cooled by the fuel to a temperature of about 420° F., the rate of thermal transfer to the fuel is equal to about 45,120 Btu/min, and is expected to result in a reduction in the infrared signature of the nozzle 36 of about 15%. If the air flows to the heat exchanger with the same flow rate and temperature but is cooled to 448° F. by the fuel in the heat exchanger, the rate of thermal transfer to the fuel is equal to about 31,680 Btu/min, which is expected to result in a reduction in the infrared signature of the nozzle 36 of about 11%. In other embodiments of the present invention, the flow rates, temperatures, and thermal transfer rates can be different, thereby potentially changing the temperature and infrared signature of the nozzle 36. For example, in one embodiment, the flow rate of the air through the heat exchanger 60 is between about 125 lbm/min and 5500 lbm/min, and the flow rate of the fuel through the heat exchanger 60 is between about 50 lbm/min and 550 lbm/min, though the flow rates can be greater or lesser in other embodiments of the invention.

Figure 2:
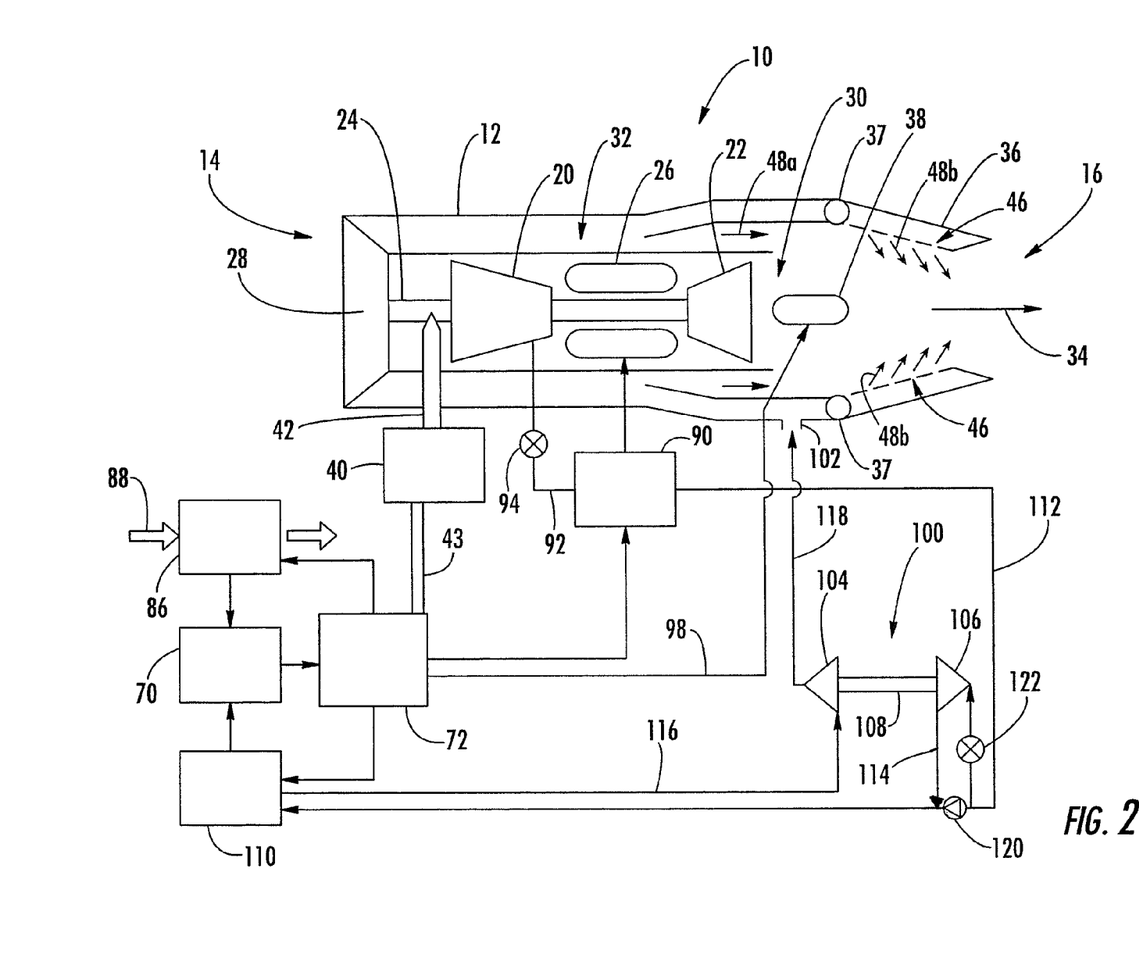
FIG. 2 is a schematic view illustrating a turbine engine with an air cooling device located outside the engine housing according to another embodiment of the present invention.

While the fan duct heat exchanger 60 described above can be used to cool the air in the fan duct 32, in other embodiments of the present invention the engine 10 can additionally or alternatively include a cooling device located outside the engine housing 12. For example, as shown in FIG. 2, a turbocooler 100 and heat exchanger 110 are provided external to the engine housing 12 and configured to provide a flow of cool air to the fan duct 32. In the embodiment of FIG. 2, the fan 28 is configured to blow air into the inlet side 14 of the fan duct 32. The fan duct 32 is structured to direct a first portion of the air into the central passage 30, as indicated by direction 48a, and a second portion of the air through apertures 46 in the nozzle 36 as indicated by direction 48b. The nozzle 36 can include hinge connections 37 so that the nozzle 36 and, hence, the speed of the exhaust gases therethrough, can be adjusted during operation. The nozzle 36 is also cooled by a flow of cool air provided from the turbocooler 100 through an inlet 102 of the fan duct 32 at an axial location proximate to the augmentor 38. The cool air from the turbocooler 100 mixes with the air in the fan duct 32 and flows through the apertures 48b in the nozzle 36 to cool the exhaust nozzle or other hot engine components. By reducing the temperature of the nozzle 36, the cool air from the turbocooler 100 can reduce the infrared signature of the aircraft.

The turbocooler 100, which can be a conventional device, includes a turbine 104 and a compressor 106 connected by a rotatable shaft 108. The shaft 108 is configured to be rotated, e.g., by the expansion of gas flowing through the turbine 104. As shown in FIG. 2, the compressor 106 of the turbocooler 100 is fluidly connected by line 112 to the precooler heat exchanger 90 to receive a flow of pressurized bleed air from the compressor 20 of the engine 10, which can be cooled in the precooler heat exchanger 90 before flowing to the compressor 106. The bleed air is then further compressed in the compressor 106 of the turbocooler 100 and discharged to the fuel/air heat exchanger 110 through line 114. The fuel/air heat exchanger 110 also receives a flow of the fuel from the fuel source 70, e.g., through the control unit 72. The fuel/air heat exchanger 110 transfers thermal energy from the bleed air to the fuel, thereby cooling the bleed air. The air then flows from the fuel/air heat exchanger 110 through line 116 to the turbine 104 of the turbocooler 100, where the air is expanded and further cooled. Thereafter, the cool air from the turbocooler 100 is delivered through line 118 to the fan duct 32 for cooling the exhaust gas as described above. Cool air from the turbocooler 100 can also be delivered to other devices on the aircraft that require cooling or devices that further cool the air.

The fuel/air heat exchanger 110 can be a single heat exchanging device or multiple heat exchanging devices arranged in parallel or series arrangements. In either case, the fuel that flows through the heat exchanger 110 for cooling the bleed air is heated by the bleed air and thereafter can be provided directly to the engine for combustion or can be recirculated to the fuel source 70, e.g., via the air/fuel heat exchanger 86 as described above.

Additional control devices such as valves and pumps can be provided for controlling the flow of the air and fuel to and from the various engine components. For example, valves 120, 122 and/or pumps can be provided in the lines 112, 114, 116, 118 connecting the turbocooler 100 to the precooler heat exchanger 90, the fan duct 32, and/or the fuel/air heat exchanger 110. The flow of the fuel can be controlled by the control unit 72 and/or by additional control devices. Thus, the flow rate of each of the fluids can be adjusted by a controller, e.g., to achieve a desired rate of thermal cooling, desired rates of fuel flow to the combustor 26 and augmentor 38, a desired rate of air flow to the fan duct 32, desired maximum or minimum temperatures of the fuel and air, and the like.

Figure 3:
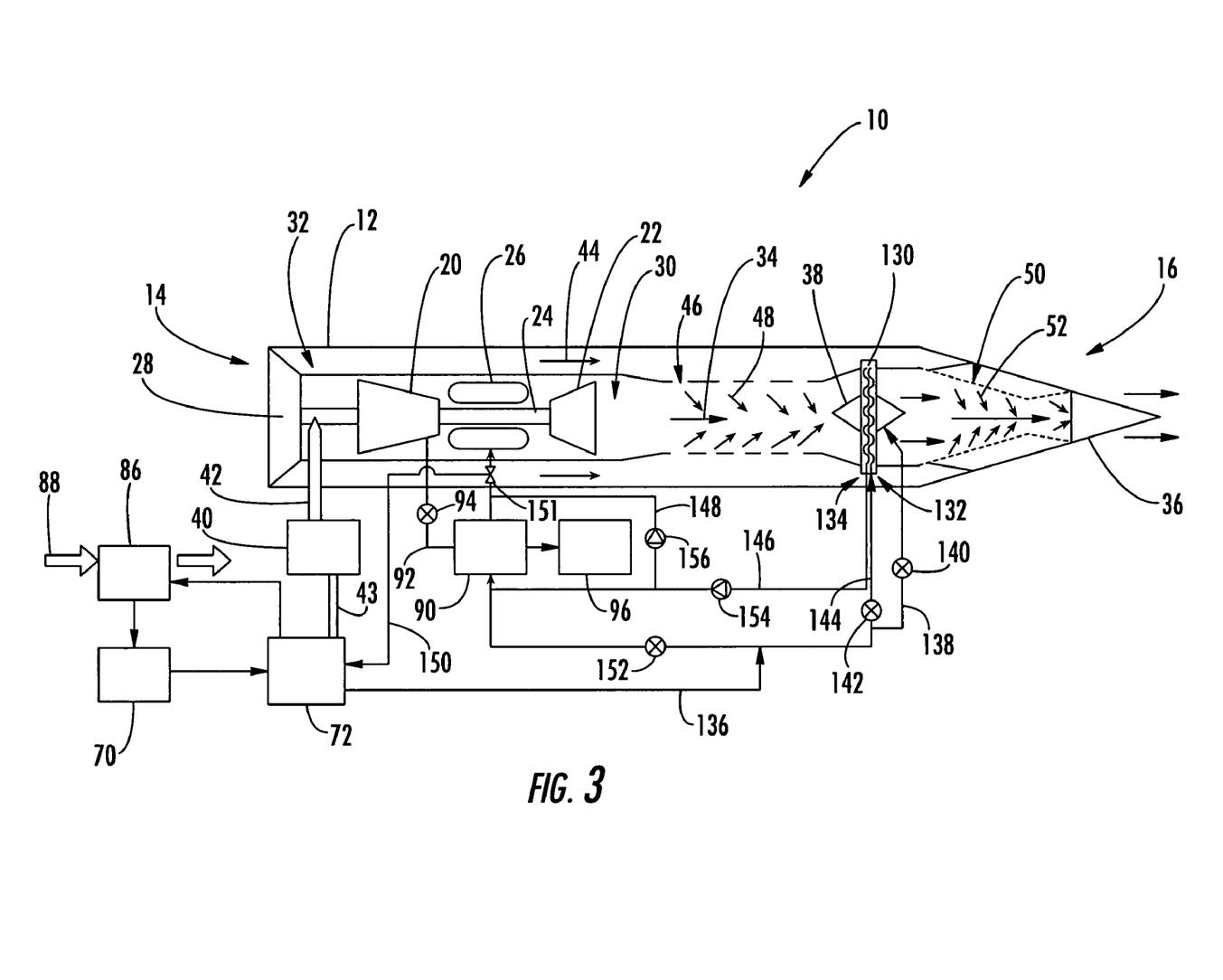
FIG. 3 is a schematic view illustrating a turbine engine with an augmentor configured to circulate fuel for cooling according to yet another embodiment of the present invention.

It is also appreciated that the fuel can be circulated to other components of the engine 10 to cool the engine components and/or the exhaust air discharged from the engine 10. For example, as shown in FIG. 3, the augmentor 38 defines a fluid circuit 130 extending between an inlet 132 and outlet 134 and is configured to circulate fuel therethrough. Fuel supply line 136 delivers fuel to the augmentor 38 via line 138 for discharge into the central passage 30 and combustion therein in an afterburner mode of operation. In another mode of operation, e.g., when the engine 10 is not operating in the afterburner mode and valve 140 is closed so that the line 138 is not delivering fuel to the augmentor 38, valve 142 can be opened so that fuel is supplied via line 144 to the augmentor 38 for circulation through the fluid circuit 130 between the inlet 132 and outlet 134. The fuel circulated though the fluid circuit 130 of the augmentor 38 cools the augmentor 38. Since the components located at and aft of the augmentor 38 have a significant influence on the infrared signature of the aircraft, cooling these hot engine components can result in reduced signature benefits. Fuel cooling of the augmentor 38 can also improve the durability of augmentor components. Thereafter, the heated fuel is delivered from the augmentor 38 through the outlet 134. The outlet 134 is fluidly connected by line 146 to the combustor, e.g., selectively via the precooler heat exchanger 90 or a bypass line 148 that bypasses the precooler heat exchanger 90. A portion of the fuel can also be recirculated to the flow control unit 72 and/or the fuel source 90 via return line 150 and valve 151.

As described above in connection with the embodiments illustrated in FIGS. 1 and 2, control devices such as valves and pumps can be provide for controlling the flow of fluids through the engine 10. For example, in addition to the valves 94, 140, 142, a valve 152 can be provided for controlling the flow of fuel from the control unit 72 to the precooler heat exchanger 90, and check valves 154, 156 can be provided for controlling the direction of the flow of the fuel from the augmentor 38 to the combustor 26.

Figure 4:
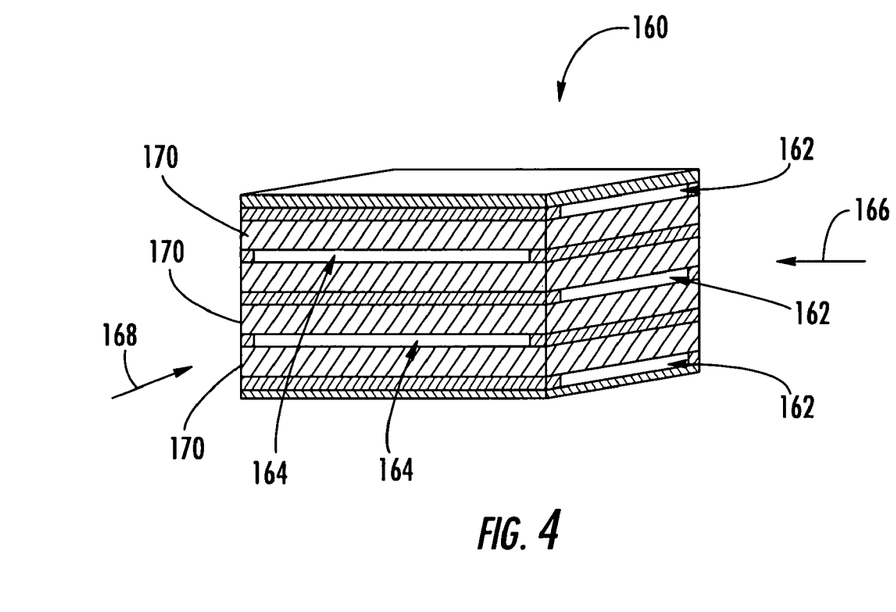
FIG. 4 is a schematic view illustrating a core portion of a heat exchanger with an electron tunneling device according to one embodiment of the present invention.

Each of the heat exchangers described above, such as the fan duct heat exchanger 60, can be a variety of heat exchanging devices. For example, FIG. 4 illustrates a portion of a core section of a heat exchanger 160 that can be used in any of the embodiments of the present invention. The heat exchanger 160 typically includes a first set of fluid passages 162 for circulating the fuel and a second set of passages 164 through which air flows. The fluid and the air can flow in the same or different directions 166, 168. In either case, the passages 162, 164 are generally fluidly disconnected but thermally communicate so that thermal energy from the air is transferred to the relatively cooler fuel. Thus, the air is cooled and the fuel is heated during passage through the heat exchanger 160.

Figure 5:
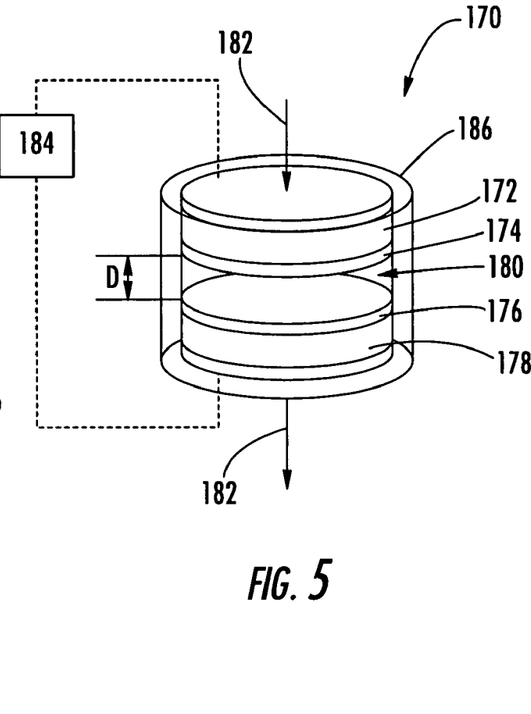
FIG. 5 is a schematic view illustrating a portion of the electron tunneling device of FIG. 4.

In addition, the heat exchangers used in the present invention can include a device for transducing some of the thermal energy of the fluids into electricity. For example, as illustrated in FIG. 4, an electron tunneling device 170 can be disposed between the adjacent passages 162, 164 so that thermal energy transferred between the passages 162, 164 results in a heat flux through the electron tunneling device 170. The electron tunneling device 170 is configured to convert a portion of the heat energy to electricity. For example, as schematically illustrated in FIG. 5, the electron tunneling device 170 includes a silicon wafer 172 and a titanium microlayer 174 on one side of the silicon wafer 172. The titanium microlayer 174 is directed toward a silver microlayer 176 on a copper substrate 178, but the titanium and silver layers 174, 176 are separated by a small gap 180, e.g., a gap having a dimension D of between about 10 and 40 angstroms. The electron tunneling device 170 can be encased in an oxide seal layer 186. The silicon wafer 172 and copper substrate 178 function as a cathode and anode, respectively. The electron tunneling device 170 is disposed in the heat exchanger 160 with the silicon wafer 172 proximate to one of the air passages 164 and with the copper substrate 178 proximate to one of the fuel passages 162. Thus, as the fuel and air pass through the passages 162, 164 thermal energy is transferred in a direction 182 across the gap 180, thereby causing an electrical potential to occur between the silicon wafer 172 and the copper substrate 178. Thus, the silicon wafer 172 and copper substrate 178 can be electrically connected to an electrical device 184, such as a battery or other electrical storage component, so that some of the thermal energy of the air is converted to electrical energy instead of heating the fuel.

In some embodiments of the invention, the electron tunneling device 170 can be in thermal communication with the nozzle 36 or other components of the engine 10. For example, the cathode side of the electron tunneling device 160 can be placed in contact with the nozzle 36, and the anode side of the device 160 can communicate with one of the fuel passages 162 so that the nozzle 36 is cooled, with a portion of the thermal energy from the nozzle 36 heating the fuel and a portion of the thermal energy being converted to electricity by the electron tunneling device 160. Further, it is appreciated that transducing devices other than the electron tunneling device 160 can be used in the present invention. For example, a thermoelectric generator can be used to generate electricity as a voltage is established in a conducting material that is subjected to a temperature gradient, i.e., the Seebeck effect. Transducing devices and methods of making such devices are further described in U.S. Pat. No. 6,100,463 to Ladd, et al., titled "Method for Making Advanced Thermoelectric Devices," the entire content of which is incorporated herein by reference.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for reducing the infrared signature of an engine, the system comprising:
   an engine passage extending between an inlet end and an exhaust end and structured to receive at least one gas therethrough;
   a fuel source configured to supply a fuel for combustion in the engine passage;
   at least one combustion device in the engine passage configured to combust the fuel in the engine passage;
   a nozzle at the exhaust end of the engine passage structured to receive the gas from the engine passage and discharge the gas;
   an augmentor configured to receive fuel and to discharge the fuel into the engine passage for combustion at a longitudinal location between the at least one combustion device and the nozzle;
   a heat exchanger positioned outside the engine passage and configured to receive a flow of air and a flow of the fuel before the fuel is combusted, and transfer thermal energy from the air to the fuel to cool the air; and
   a turbocooler having a compressor and a turbine, the compressor of the turbocooler being configured to compress the air and provide the air to the heat exchanger, and the turbine configured to receive the air from the heat exchanger, expand and cool the air, and deliver the cooled air to the engine passage at an axial location proximate the augmentor, thereby cooling the nozzle and reducing the infrared signature of the engine.

2. A system according to claim 1 wherein the heat exchanger is configured to deliver the cooled air into the engine passage at the nozzle.

3. A system according to claim 1 wherein the heat exchanger is configured to receive the air from a compressor in the engine passage, the air being compressed by the compressor in the engine passage during operation of the engine.

4. A system according to claim 1 wherein the heat exchanger is configured to heat the fuel to a temperature of at least 300° F.

5. A system according to claim 1 wherein the fuel source is configured to supply a high heat sink fuel that is stable at a temperature greater than 300° F.

6. A system according to claim 1, further comprising a precooler heat exchanger configured to receive a flow of compressed air from a compressor in the engine passage and a flow of the fuel, the air being compressed by the compressor in the engine passage during operation of the engine, and the precooler heat exchanger transferring thermal energy from the air to the fuel.

7. A system according to claim 1, further comprising a transducer disposed in the heat exchanger between the flow of the air and the flow of the fuel, the transducer configured to convert thermal energy from the air to electricity.

8. A system for reducing the infrared signature of an engine, the system comprising:
   an engine passage defining a central passage and a fan duct extending in a longitudinal direction of the engine passage between an inlet end and an exhaust end;
   a fuel source configured to supply a fuel for combustion in the central passage;
   a first compressor in the central passage configured to provide a flow of compressed air for combustion with the fuel in the central passage;
   at least one combustion device in the central passage configured to combust the fuel with the compressed air to form an exhaust gas;
   a nozzle at the exhaust end of the engine passage structured to receive the exhaust gas from the central passage and discharge the exhaust gas;
   an augmentor configured to receive fuel and to discharge the fuel into the engine passage for combustion at a longitudinal location between the at least one combustion device and the nozzle;
   a heat exchanger disposed outside the engine passage and configured to receive a flow of the fuel from the fuel source and circulate the fuel to the combustion device, the heat exchanger also being configured to receive a flow of air, and transfer thermal energy from the air to the fuel to cool the air and
   a turbocooler having a second compressor and a turbine, the second compressor being configured to receive air from the first compressor, compress the air, and provide the air to the heat exchanger, the turbine being configured to receive the air from the heat exchanger, expand and cool the air, and deliver the cooled air to the engine passage at an axial location proximate the augmentor to thereby cool the nozzle and reduce the infrared signature of the engine.

9. A system according to claim 8, further comprising a precooler heat exchanger configured to receive a flow of compressed air from the first compressor in the engine passage and a flow of the fuel, the precooler heat exchanger transferring thermal energy from the air to the fuel, and the second compressor of the turbocooler being configured to receive the air from the first compressor via the precooler.

10. A system according to claim 8 wherein the heat exchanger is configured to heat the fuel to a temperature of at least 300° F.

11. A system according to claim 8, further comprising a transducer disposed in the heat exchanger and configured to be heated by the air therein and convert thermal energy from the air to electricity.

12. A system according to claim 8 wherein the fuel source is configured to supply a high heat sink fuel that is stable at a temperature greater than 300° F.

13. A method for reducing the infrared signature of an engine, the method comprising:

compressing air in an engine passage;

combusting fuel and a portion of the compressed air in the engine passage to form an exhaust gas;

adding additional fuel to the exhaust gas with an augmentor and combusting the additional fuel to form an exhaust that is discharged from the engine through a nozzle;

compressing a flow of air in a compressor of a turbocooler;

circulating a flow of the fuel through a heat exchanger disposed outside the engine passage;

delivering the compressed flow of air from the compressor of the turbocooler to the heat exchanger and thereby transferring thermal energy in the heat exchanger from the air to the fuel to cool the air;

delivering the fuel from the heat exchanger to the combustion device for combustion;

expanding the air from the heat exchanger in a turbine of the turbocooler to thereby cool the air; and delivering the cooled air from the turbine of the turbocooler to the engine passage at an axial location proximate the augmentor to thereby cool the nozzle and reduce the infrared signature of the engine.

14. A method according to claim 13 further comprising circulating the air through a precooler heat exchanger before the air is compressed in the compressor of the turbocooler, the precooler receiving a flow of fuel and transferring thermal energy from the air to the fuel.

15. A method according to claim 13 wherein said circulating step comprises heating the fuel to a temperature of at least 300° F.

16. A method according to claim 13, further comprising heating a transducer with the air in the heat exchanger and converting thermal energy from the air to electricity.

17. A method according to claim 13, further comprising providing the fuel as a high heat sink fuel that that is stable at a temperature greater than 300° F.

\* \* \* \* \*